(12) United States Patent
Derks

(10) Patent No.: US 6,233,334 B1
(45) Date of Patent: May 15, 2001

(54) TELECOMMUNICATION CIRCUIT AND A TELECOMMUNICATION DEVICE

(75) Inventor: Henk Derks, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/015,753

(22) Filed: Jan. 30, 1998

(30) Foreign Application Priority Data

Feb. 7, 1997 (EP) .................................................. 97200340

(51) Int. Cl.$^7$ ...................................................... H04M 1/76
(52) U.S. Cl. .............................................. 379/398; 379/387
(58) Field of Search .................................... 379/387, 394, 379/398–400, 402, 403

(56) References Cited

U.S. PATENT DOCUMENTS

| | | | |
|---|---|---|---|
| 5,226,078 | 7/1993 | Coulmance et al. | 379/413 |
| 5,515,434 | * 5/1996 | Cotreau | 379/399 |

* cited by examiner

*Primary Examiner*—Wing F. Chan

(57) ABSTRACT

An interface circuit has a circuit input. The circuit has a first controlled amplifier combined with an at least resistive element. The first amplifier provides at a first output a first output current dependent on a voltage of the circuit input. The circuit also has a second controlled current amplifier. The second amplifier provides at a second output a second output current dependent on a current of the circuit input. The second output is coupled to the first output. The circuit further comprises a third controlled current with a third input. The third input is coupled to the first and second outputs.

11 Claims, 5 Drawing Sheets

TELECOMMUNICATION CIRCUIT AND A TELECOMMUNICATION DEVICE

BACKGROUND OF THE INVENTION

The present invention relates to a telecommunication circuit having an input impedance and containing current sources.

The present invention also relates to a telephone circuit, telephone and telecommunication device comprising such a telecommunication circuit.

Such telecommunication circuits containing current sources are known in the art of telephone apparatus from U.S. Pat. No. 5,226,078 in which they are described as being a useful tool in controlling the line current in a wired connection between the telephone exchange and the subscriber. At the subscriber end, a communication device, such as a telephone or facsimile or the like, has to have line transmission circuitry which has to perform a number of functions. Examples of required functions, apart from the actual transmission and reception, are:

termination of the line with a correct definite impedance, deriving of power from the line for feeding internal and/or peripheral devices and modulating the line current with an AC-signal to be transmitted. Details of these requirements may vary from country to country. These requirements should be layed down so as to form standards. However, even the standards are changed frequently. One of the features varying per country is the value of the terminating line impedance. The above-mentioned US patent mentions off-chip components that are apparently necessary for performing the adjustments required by the varying standards.

OBJECTS AND SUMMARY OF THE INVENTION

It is an object of the present invention to provide a telecommunication circuit that can be used to cope with at least the varying line impedance in a way which allows smooth control thereof without jeopardizing the desired degree of integration of circuit components on the chip. To this end, the telecommunication circuit according to the invention is characterised in that at least two current sources are controlled current amplifiers, which are connected in such a way that their respective current transfer ratios determine the input impedance of the circuit. This enables the required input impedance to be adjusted simply by influencing the current transfer ratio of the controlled current amplifier(s). Influencing the transfer ratio of a controlled current amplifier takes place by means of controlling a control signal supplied to the controlled current amplifier. By means of this control signal, the input impedance for a particular country is set to the desired value, without any presettings or preadjustments in the telecommunication circuit being necessary. This even allows the input impedance to be controlled by programming it to the desired value.

A very simple embodiment of the telecommunication circuit in accordance with the invention is characterised in that the at least two controlled current amplifiers have outputs that are connected to one another.

A further embodiment of the telecommunication circuit according to the invention is characterised in that the telecommunication circuit comprises a further current amplifier having an input, and the two outputs of the at least two controlled current amplifiers and the input of the further current amplifier form a current summing node. Such a further embodiment is particularly suited for use in a telephone set and for controlling the telephone line current.

A still further embodiment is characterised in that at least the further current amplifier has two outputs, and, in particular, momentarily only one of the outputs conducts an output current. This still further embodiment of the telecommunication circuit according to the invention is particularly useful for providing a supply point as indicated in the aforementioned second function, which supply point can be used to electrically feed internal and peripheral circuitry, such as for hands free facilities, listening-in features, dialling features, loudspeaker features etcetera.

Another embodiment of the telecommunication circuit according to the invention is characterised in that the circuit comprises an AC-current source which is at least connected to the at least two controlled current amplifiers. This satisfies the requirements of the aforementioned third function as the AC-current source is capable of modulating the line current with the AC-signal to be transmitted, resulting in a flat frequency characteristic of the line voltage despite a complex line termination impedance. Desired replacement schemes of various telephone circuits in a variety of countries can be simulated in an embodiment of the telecommunication circuit according to the invention, which is characterised in that the controlled current amplifiers current transfer ratio of at least one of the controlled current amplifiers is frequency-dependent.

BRIEF DESCRIPTION OF THE DRAWINGS

These and other aspects of the invention will be apparent from and elucidated with reference to the embodiments described hereinafter.

In the drawings.

In the Figures, like reference numerals refer to like parts.

DETAILED DESCRIPTION OF THE PREFERRED EMBODIMENT

Figure 1:
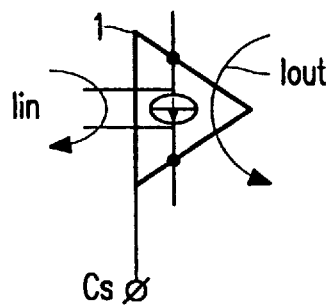
FIG. 1 shows a first building block of a controlled current amplifier for use in the telecommunication circuit according to the invention.
Figure 2:
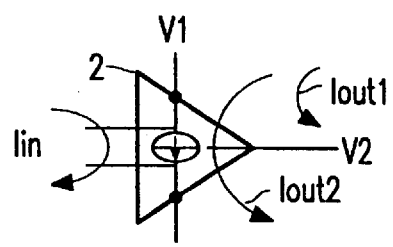
FIG. 2 shows a second building block for use in the telecommunication circuit according to the invention.

FIGS. 1 and 2 are schematic representations of controlled current amplifiers 1 and 2 of a first and a second type, respectively. Iin and Iout denote input and output currents, respectively, of the controlled current amplifier 1. A controlled current amplifier will hereafter be denoted by CA. The relationship between input and output currents of the CA1 of the first type can be given by the formula:

$$Iout=T1*Iin$$

wherein T1 is the current transfer ratio of CA1. CA2 is of a second type and has two outputs carrying potentials V1 and V2 for conveying currents Iout1 and Iout2 in a vertically drawn sense and a horizontally drawn sense as indicated in FIG. 2. The actual direction of the output current depends on the voltages V1 and V2. If:

V1 >V2 than Iout2=0, otherwise Iout1=0
For CA2 the formula is:

$$(Iout1 \text{ or } Iout2)=T2*Iin$$

wherein T2 is the current transfer ratio of CA2.

Generally controlled current amplifiers such as CA1, CA2, CA6, CA7, and CA12 have a very low input impedance and a very high output impedance. Their current transfer ratio can range from finite, such as CA6 and CA7, to practically infinite, such as CA12, in which case CA12 will not be controlled. The current transfer ratio, which may be larger or smaller than 1, of any CA can be influenced by means of any control signal $C_S$, such as a current control signal, a voltage control signal etcetera.

Figure 10:
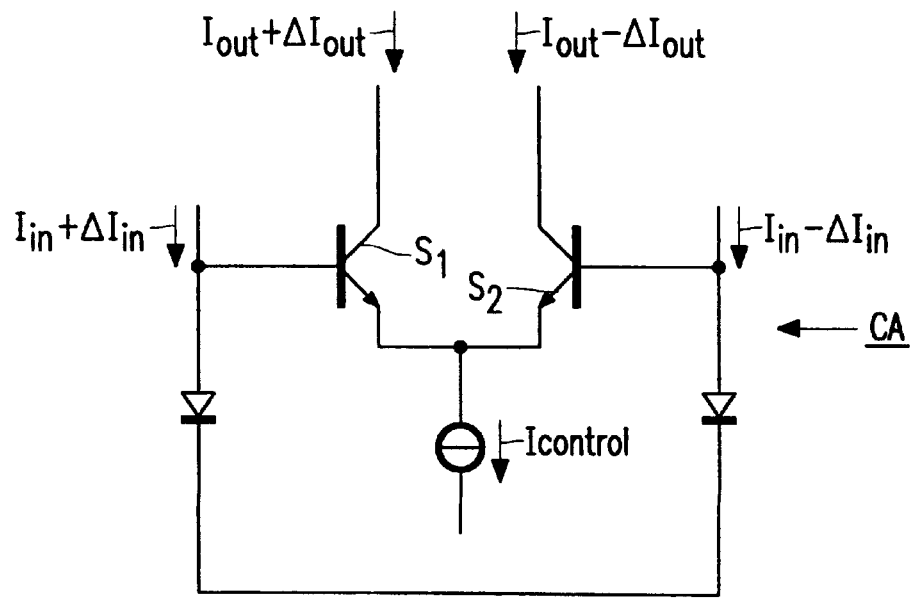
FIG. 10 shows a possible embodiment of a controlled current amplifier.

A typical outline of a CA is shown in FIG. 10. The CA shown is in the form of a current controlled current amplifier, and this amplifier per se is also known as "current gain cell", or "current controlled differential current mode amplifier". The CA comprises two emitter coupled controllable semiconductors S1 and S2 having respective diode connected control inputs, whereto respective ingoing currents $I_{in}+/-\Delta I_{in}$ flow. To the respective main current streams of S1 and S2 currents $I_{out}+/-\Delta I_{out}$ flow, whereas the control signal in this case emanates from a current source $I_{control}$ which is connected to both emitters of S1 and S2. The relationship for the current transfer ratio T is given by is:

$$T=\Delta I_{out}/\Delta I_{in}=I_{out}/I_{in}=I_{control}/2*I_{in}$$

Figure 3:
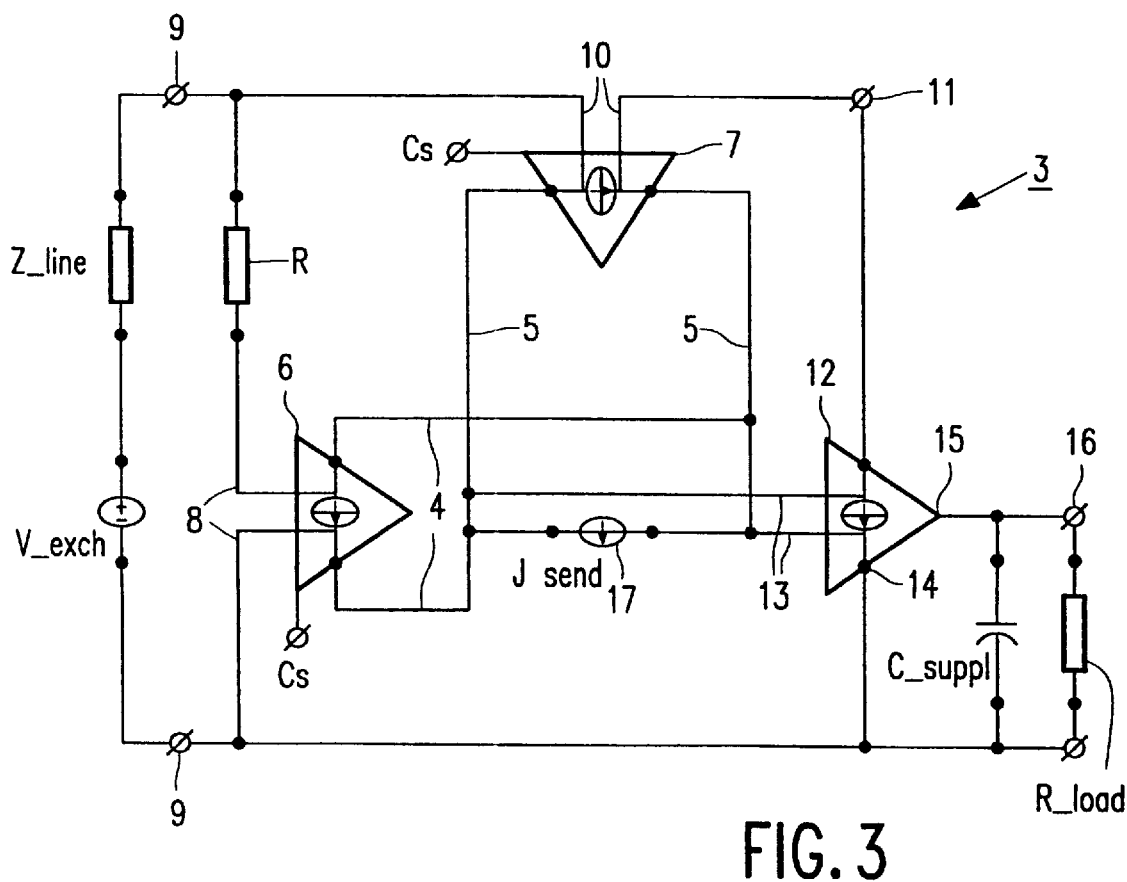
FIG. 3 shows a first possible embodiment of the telecommunication circuit according to the invention.

FIG. 3 denotes a first possible embodiment of a telecommunication circuit 3 for a situation in which only the outputs 4 and 5 of CA6 and CA7, both being of the first type, are connected in series with one another. Input 8 of CA6 is generally connected to line terminals 9 through an impedance, but specifically through a resistor R. On the exchange side connected to line terminals 9, there is schematically shown a line impedance Z_line connected in series with a line voltage source V_exch. Input 10 of CA7 is connected to line terminal 9 and to an internal line terminal 11. In this case it can simply be derived that, if T12 is very large (practically infinite), the input resistance of the circuit 3 is:

R*(T7/T6)

wherein T6 and T7 are the current transfer ratios of CA6 and CA7 respectively.

In a second embodiment of the telecommunication circuit 3 CA12, being of he second type, is connected to the node of CA6 and CA7. In particular input 13 of CA12 is connected in parallel to output 5 of CA7. CA12 has one output 14, which is connected to lower terminal 9 and the other output 15 is connected to supply terminal 16 connected to a schematically shown load-supply RC combination for supplying peripheral devices (not shown). This RC combination is only provided with an output current through output 15 if the internal line voltage V11 on terminal 11 is larger than the supply voltage on terminal 16, otherwise output current flows to lower terminal 9.

In a third embodiment of the telecommunication circuit 3, a modulating AC current source 17 is connected to the node of CA6, CA7 and possibly CA12 for providing a modulating current J_send. It can be demonstrated that for AC-signals, such as speech signals, the impedance synthesized by the circuit 3 between terminals 9 is equal to $Z_{line}$, the line voltage V_line on terminal 9 can be approximated by:

R*J_send/(2*T7)

Figure 4:
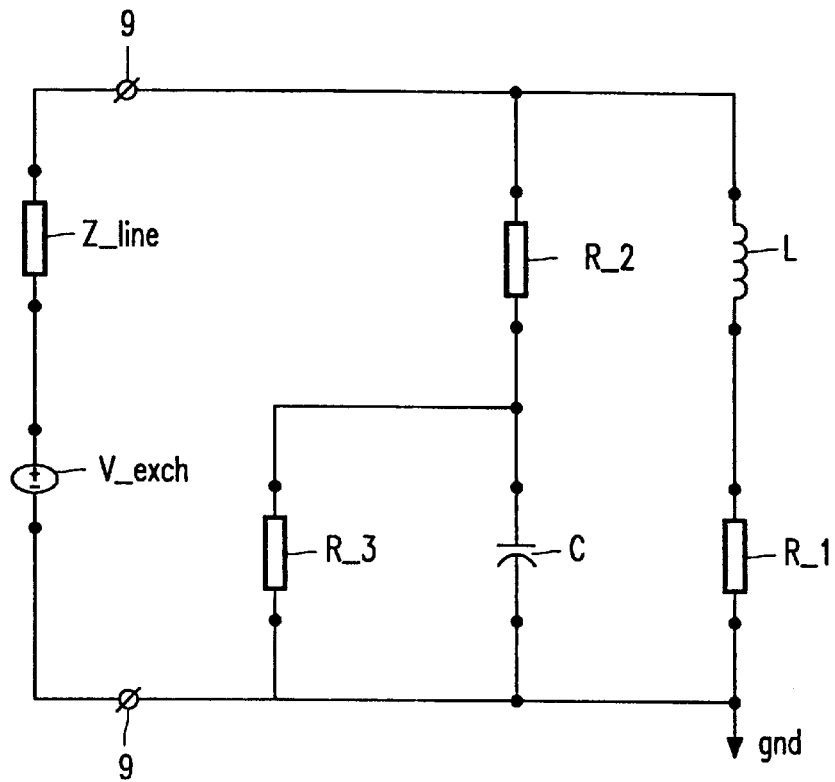
FIG. 4 shows a well-known electric replacement scheme of the line termination impedance of a telephone.

FIG. 4 shows a well-known electric replacement scheme of the line termination impedance of a generally known telephone. In the case of a complex termination impedance, it comprises a parallel combination of a series-connected coil L and resistor R_1, and a resistor R_2 which is series-connected with a parallel arrangement of a resistor R_3 and capacitor C, which combination is connected to line terminals 9. If the termination impedance is real, R_2 and C are omitted. It can be demonstrated that this electric replacement scheme can be simulated by a proper choice of the current transfer ratios of each of the CAs of FIG. 5. The embodiment shown therein is an extension of the one shown in FIG. 3 in that CA18 and CA19 are added. Contrary to CA6, CA7 and CA12, both CA18 and CA19 have a frequency-dependent current transfer ratio, which will be explained hereinbelow. Inputs 20 and 21 of CA18 and CA19, respectively, are connected in series with inputs 8 and 10 of CA 6 and CA7, respectively. Both outputs 22 and 23 are connected to the above-mentioned node. For reasons of clarity, the various control inputs $C_S$ are omitted in the figures. The complex form T18 and T19 of CA18 and CA19, respectively, can, in terms of the frequency w (with w=2*π*f), be denoted as:

$$T18,19=T18,19(jw)=T18,19/(1+jw\tau18,19)$$

which means physically that T18 and T19 have a low-pass character having time constants τ18 and τ19, respectively.

Figure 6:
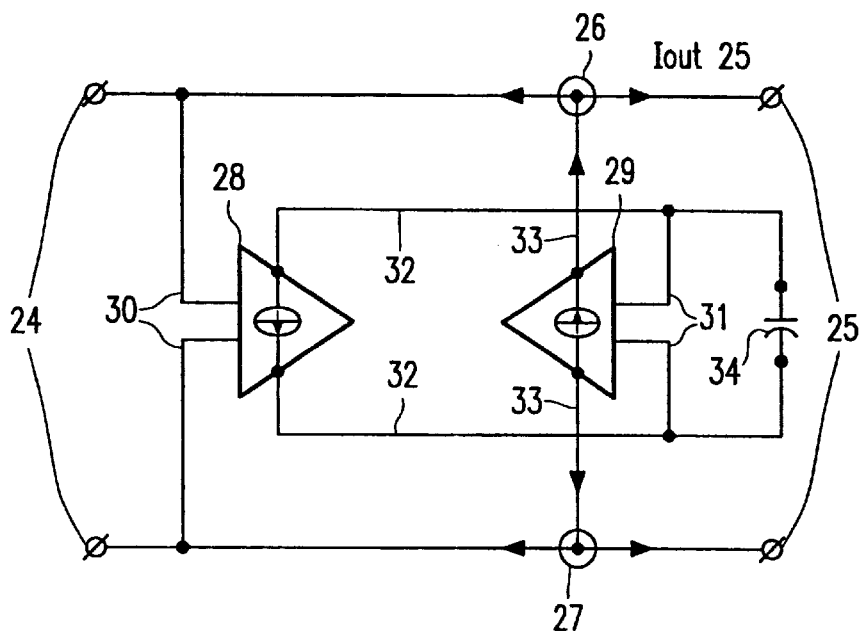
FIG. 6 shows a telecommunication circuit for realising a controlled current amplifier having a frequency-dependent current transfer ratio.

FIG. 6 shows a possible embodiment of a CA having such a low-pass character. It comprises a main input 24 and a main output 25, which are interconnected by means of encircled current-splitting means 26 and 27, such as well-known current mirror means. A current flowing to the current splitting means 26, 27 is split into substantially equal outgoing currents. The CA shown in FIG. 6, itself comprises CA28 and an OTA29, having respective inputs 30, 31, and outputs 32 and 33. The OTA29 is an Operational Transconductance Amplifier, which is in fact a voltage-current converter having a conductance G. Input 30 is connected to main input 24, and output 32 is connected to input 31 and to a capacitor 34 connected parallel thereto. Output 33 is connected to the main output 25 through the current-splitting means 26, 27. It can be shown that theoretically the current transfer ratio T of the CA as a whole correspnds to:

$$T(jw)=1/(1+jw\tau)$$

wherein τ can be expressed in terms of a capacitance value C, current transfer ratio T of CA28, and the voltage transfer ratio G (being Iout25 divided by the voltage across input 31). Thus, a variation of T leads to a shift of the tilting frequency of the frequency-dependent current transfer ratio T(jw) of the CA shown. Of course, by a variation or a replacement of the capacitor C by a coil L (not shown) other frequency dependencies can, if desired be simulated in order to comply with different requirements imposed on the circuit 3 by, for example, local telecommunication authorities.

Figure 5:
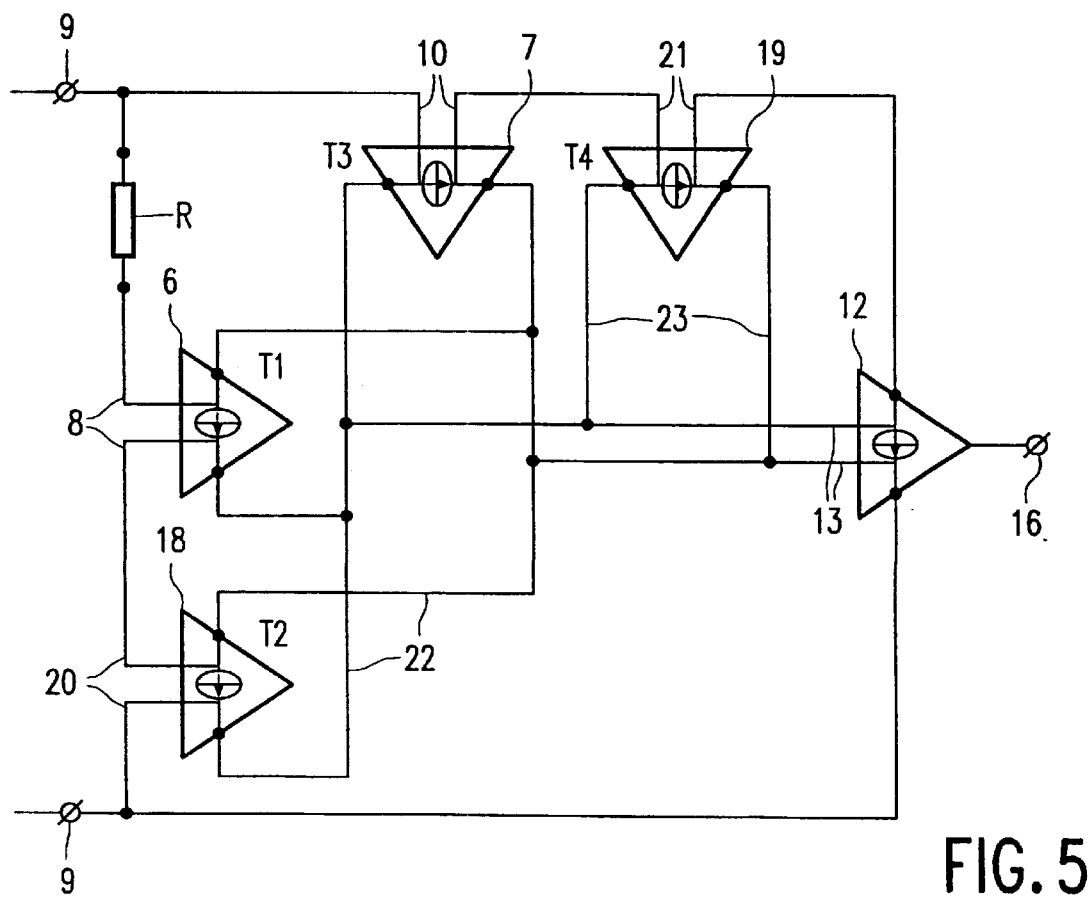
FIG. 5 shows a telecommunication circuit according to a second possible embodiment for simulating the scheme of FIG. 4.
Figure 7:
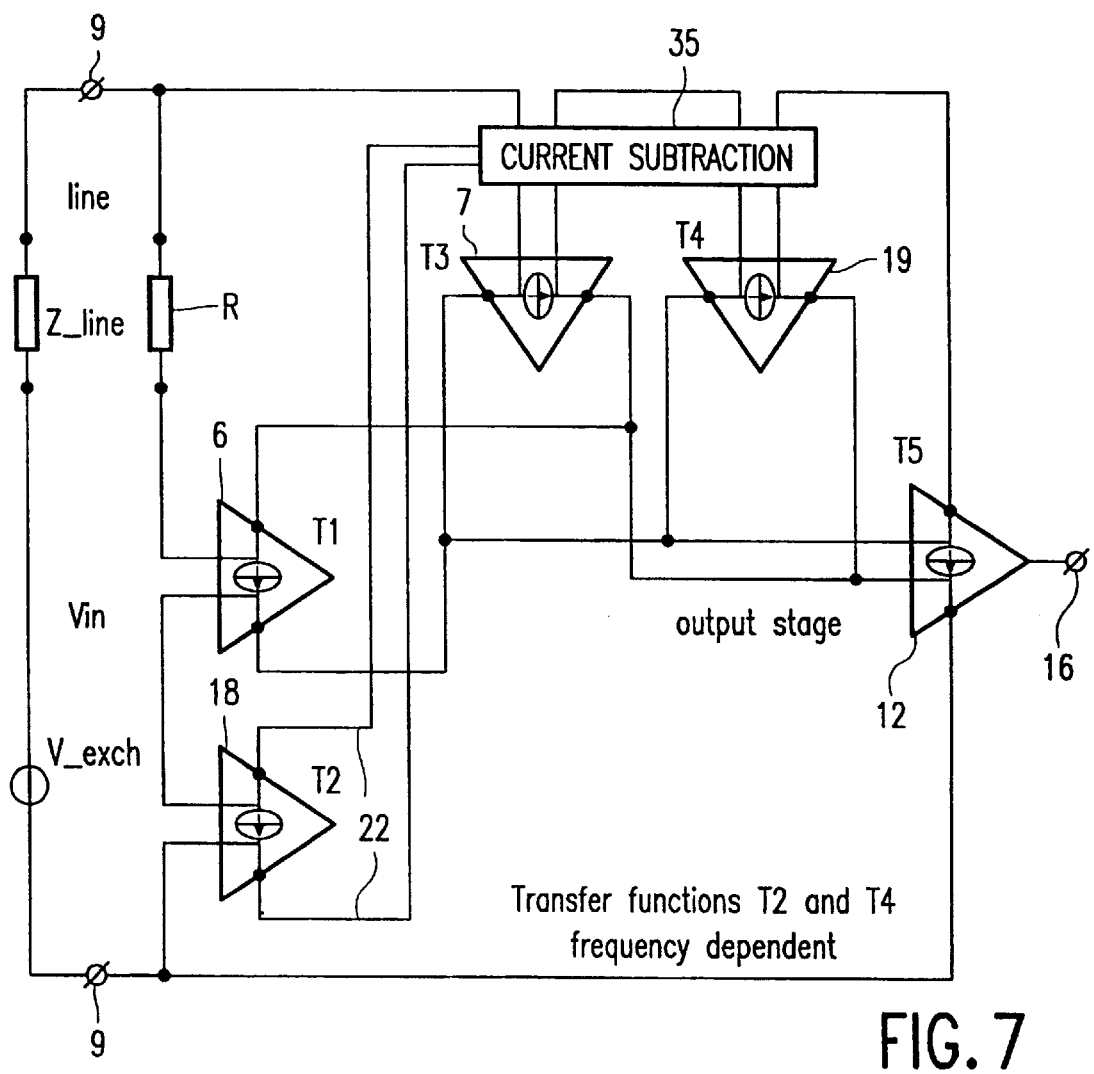
FIGS. 7 and 8 show third and fourth embodiments, respectively, of the telecommunication circuit according to the invention, FIG. 9 schematically shows a telecommunication device in the form of a telephone having such a circuit.

FIG. 7 shows an alternative design of the telecommunication circuit 3 of FIG. 5, except that a current subtraction means 35 connected to output 22 of CA18 is added in the path from line terminal 9 to supply terminal 16. In the current-subtraction means 35, the DC line current is subtracted from the AC-line current before entering CA7 and CA19 in order to separate AC and DC line current handling in the circuit 3. Theoretically, this circuit embodiment shows simplified expressions if it is used for simulating the telephone replacement scheme of FIG. 6.

Figure 8:
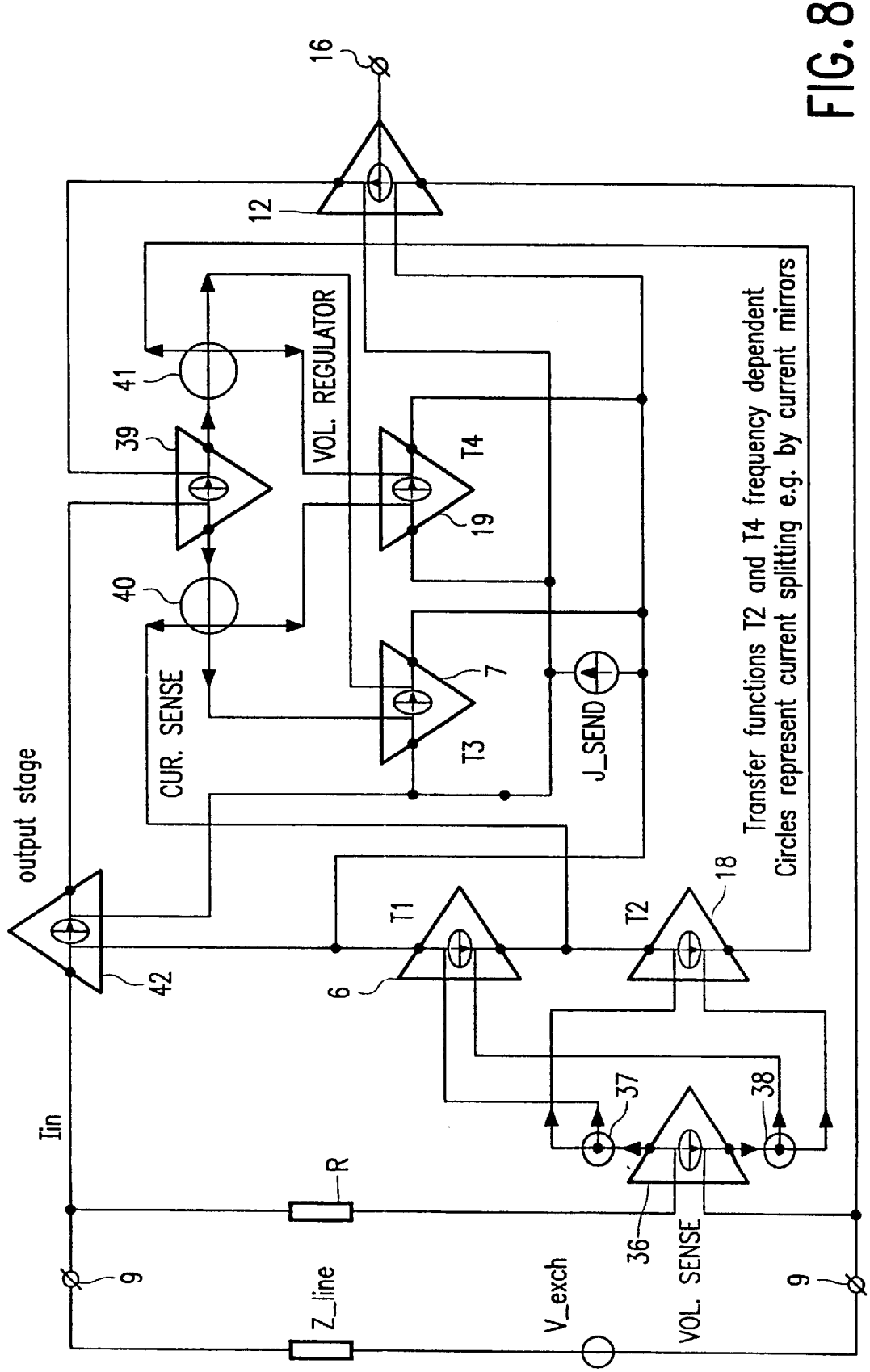

FIG. 8 shows a further alternative embodiment of the telecommunication circuit 3 of FIG. 7. The circuit 3 comprises a line voltage sensing CA36 whose output is provided with current splitting means 37, 38 to feed CA6 and CA18, a line current sensing circuit 39 whose output is provided with current splitting means 40 and 41 to feed CA7 and CA19, and an output CA42 which now achieves the required loop gain, whereas CA12 now only serves as a purpose of voltage regulator to maintain a stable supply voltage on supply terminal 16. The result is a separate, easily controllable DC-loop in the circuit 3.

Figure 9:
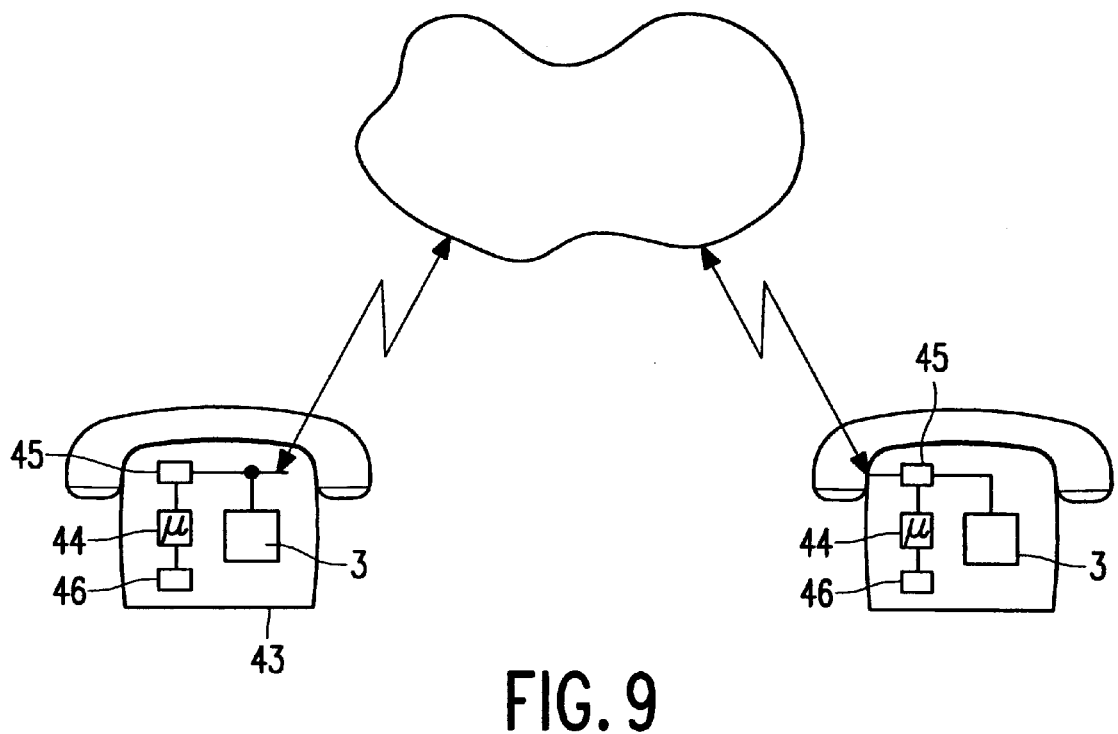

FIG. 9 shows a telecommunication device 43 in the form of a telephone having a telecommunication circuit 3, which telephone is connected to an exchange means (not shown). Generally, the telephone 43 will be controlled by a microprocessor 44 and provided with the basic features 45 for providing transmission and reception possibilities, which additional features 46 such as listening-in, loudspeaker facilities, hands-free facilities, dialling facilities etcetera are added.

What is claimed is:

1. A telecommunication device comprising:

a telecommunication circuit with a circuit input, the circuit comprising a first controlled current amplifier combined with an at least resistive element providing at a first output a first output current dependent on a voltage of the circuit input;

a second controlled current amplifier providing at a second output a second output current dependent on a current of the circuit input, the second output is coupled to the first output; and, a third controlled current amplifier with a third input coupled to the first and second outputs.

2. The telecommunication device of claim 1, wherein the third amplifier has a third output conducting a third output current when the voltage of the circuit input is greater than a voltage of the third output.

3. A telecommunication circuit with a circuit input, the circuit comprising:

a first controlled current amplifier combined with an at least resistive element providing at a first output a first output current dependent on a voltage of the circuit input;

a second controlled current amplifier providing at a second output a second output current dependent on a current of the circuit input, the second output is coupled to the first output; and, a third controlled current amplifier with a third input coupled to the first and second outputs.

4. A telecommunication circuit according to claim 3, further comprising a separate DC-loop.

5. A telecommunication circuit according claim 4, characterised in that the separate DC-loop comprises current-mirror or current-subtracting means.

6. A telecommunication circuit according to claim 3, for use in a telephone, wherein the first and second current amplifiers are interconnected and constructed as to simulate the line-replacement scheme of the telephone.

7. The telecommunication circuit of claim 3, wherein the third amplifier has a third output conducting a third output current when the voltage of the circuit input is greater than a voltage of the third output.

8. A telecommunication circuit according to claim 3, further comprising an AC-current source that is at least coupled to the first and second current amplifiers.

9. A telecommunication circuit according to claim 3, further comprising controlled current amplifiers coupled in a parallel arrangement to the first and second current amplifiers.

10. A telecommunication circuit according to claim 3, wherein a current transfer ratio of at least one of the first and second current amplifiers is frequency-dependent.

11. The telecommunication circuit of claim 3, wherein the third input has a high impedance and, the first output, the second output and the third input form a current summing node.

* * * * *